2,808,439

PREPARATION OF SUBSTITUTED CHLORAMINES AND SUBSTITUTED HYDRAZINES

Wayne T. Barrett, Arnold, and Preston L. Veltman, Severna Park, Md., assignors to W. R. Grace & Co., New York, N. Y., a corporation of Connecticut No Drawing. Application November 26, 1954,
Serial No. 471,486

16 Claims. (Cl. 260—583)

This invention relates to an improved process for the preparation of substituted chloramines and substituted hydrazines. In specific aspects, it relates to an anhydrous vapor phase process for preparing substituted chloramines, and to an anhydrous liquid phase process for preparing substituted hydrazines.

Heretofore, substituted chloramines for the most part have been prepared in aqueous media by the reaction between an organic amine and an aqueous solution of a hypochlorite, such as sodium or calcium hypochlorite. While this method is satisfactory, the process is complicated by the removal of water if an anhydrous substituted chloramine product is desired, or if the product is subsequently to be employed in a process which cannot tolerate the presence of water. While anhydrous methods starting with an organic amine have been proposed they are of academic interest only, because of the intricacy resulting from the use of non-aqueous solvents for one or more of the reactants. We have discovered an improved anhydrous process for the direct oxidation of a primary or secondary organic amine to the corresponding substituted chloramine, which does not employ non-aqueous solvents.

During the past decade, the demand for a guided missile propellant has led to extensive research on the preparation of hydrazine. While hydrazine has demonstrated its superiority over petroleum derivatives as a missile fuel, it is difficult to handle and store, solidifies at about the freezing point of water, and is incompatible with many hydrocarbon fuels. In order to overcome these undesirable characteristics and still retain the propellant power of hydrazine, recent emphasis has been placed on certain of the hydrazine derivatives as possible substitute fuels. For example, methyl hydrazine, 1,2-dimethyl hydrazine and particularly, 1,1-dimethyl hydrazine do not possess many of the undesirable characteristics of hydrazine. In addition to the current interest in 1,1-dimethyl hydrazine as a propellant, this material is finding limited use in the pharmaceutical field. Other hydrazine derivatives find application directly or as intermediates in the field of insecticides, plastics, coatings and resins, dye intermediates, pharmaceuticals, surface active agents, photographics, etc.

The methods of preparing substituted hydrazines disclosed in the literature are in most instances cumbersome processes which necessitate the separation of the substituted hydrazine product from an aqueous solution or suspension, thus further multiplying the unit operations and contributing to the almost prohibitive cost of these materials. For example, one leading producer prepares the substituted hydrazine by first acidifying an organic amine, for example, dimethylamine, to form the amine acid salt. Sodium nitrite is added and reacts with the salt to form dimethyl nitrosamine, which is then reduced with a metal to 1,1-dimethyl hydrazine. The product in aqueous solution is then dehydrated and refined by a complicated mechanical and distillation operation. According to another well known process, an aqueous solution of chloramine, prepared by reacting ammonia with sodium hypochlorite, is employed for the direct oxidation of an organic amine, again for example, dimethylamine. The resulting aqueous mixture containing 1,1-dimethyl hydrazine is then passed through a series of evaporators and a still where it is concentrated and purified. Both of the processes are carried out in aqueous phase and involve separation of the product from an aqueous medium.

It is an object of the present invention to provide an improved method for the preparation of substituted hydrazines. It is another object to provide an anhydrous method for preparing substituted hydrazines. It is a still further object of the present invention to provide an improved method for preparing anhydrous substituted chloramines.

We have discovered that an anhydrous organic chloramine may be prepared by the direct oxidation of excess primary or secondary organic amine vapor, for example, mono or dialkyl amine, with gaseous chlorine. We have also discovered that an anhydrous organic substituted hydrazine may be prepared by reacting an anhydrous substituted chloramine, such as the substituted chloramine prepared as just described, with excess ammonia, primary, or secondary amine under sufficient pressure to maintain the reactants in the liquid phase.

The reaction between the organic amine vapor and chlorine proceeds according to the following equation for primary amines:

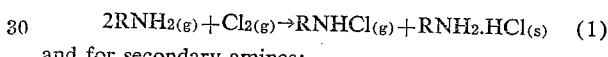

and for secondary amines:

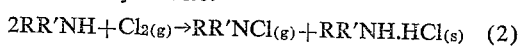

The substituents R and R' may be alkyl, aryl or alicyclic carbon radicals, and in the case of a secondary amine starting material, the substituents R and R' may be the same or different alkyl, aryl or alicyclic radicals, or R may be an alkyl and R' an aryl radical, etc. As indicated in Equations 1 and 2, for each mol of substituted chloramine formed there is also formed one mol of amine hydrochloride solid.

In carrying out the novel process, dry chlorine gas is rapidly mixed with an excess of anhydrous amine vapor in a reaction vessel so constructed or fitted with the necessary filtering apparatus that solid amine hydrochloride may be readily removed from the gaseous reaction mixture containing substituted chloramine product and unreacted amine. The minimum temperature at which this vapor phase process is carried out is governed to an extent by the boiling point of the starting amine at atmospheric pressure. However, we have observed that if the reaction temperature at atmospheric pressure, although well above the boiling point of the tarting amine, is too low, a liquid is formed in the reaction vessel which reduces the yield of substituted chloramine. While we do not choose to be bound by the following explanation, it is our opinion that the amine hydrochloride forms a liquid complex with either the starting amine or the chloramine product or both in which the chloramine product is soluble and upon dissolution decomposes. We have been able to overcome this liquid formation by carrying out the reaction above about 50° C. in the case of the lower primary and secondary alkyl amines. Obviously, it is necessary to conduct the reaction at somewhat higher minimum temperatures with less volatile starting amines. In any event, the reaction temperature must always be sufficiently high to prevent the formation of a liquid phase in the reaction vessel. Again in the case of the lower alkyl primary and secondary amines, for example, methyl and dimethyl amine, no significant advantage is obtained by increasing the reaction temperature above that required to prevent liquid formation at atmospheric pressure.

The present process is conveniently carried out at atmospheric pressures, higher pressure generally not being required to cause the reactions illustrated in Equations 1 and 2 to proceed to the right. At atmospheric pressure yields in excess of 80% of theoretical have been obtained. The present invention of course also contemplates carrying out the novel process at either reduced or super atmospheric pressures.

In carrying out our novel process, the amine starting material is present in excess over that required to react with the chlorine present to form the substituted chloramine. We have found that this excess is desirably at least about 5 mols of amine per mol of chlorine. At mol ratios below about 5:1, substituted chloramine is formed, but yields are substantially reduced. We have observed that maximum yields are obtained at amine:chlorine mol ratios between about 15:1 and 60:1 in the case of secondary amines. From an economic standpoint, the exact mol ratio employed should not be much above the minimum ratio which will produce the maximum yield of substituted chloramine product. It is also within the scope of the present invention to carry out the reaction between the amine vapor and chlorine gas in an inert diluent atmosphere, for example, nitrogen. The inert diluent has a beneficial effect upon the yield of substituted chloramine, in that it permits a reduction in the mol ratio of amine to chlorine necessary for a given yield of substituted chloramine.

As already indicated, the amine hydrochloride formed in the process is a solid which is easily filtered from the substituted chloramine-amine gaseous reaction mixture. Following separation of solids, the reaction mixture is condensed at a low temperature, and the substituted chloramine product separated from the starting amine by distillation.

The present invention also provides a process for preparing substituted hydrazine by the reaction between ammonia, a primary, or a secondary amine and an anhydrous substituted chloramine under certain conditions. The reactions involved are illustrated as follows with a mono-substituted chloramine:

$$RNHCl + 2NH_3 \rightarrow RNHNH_2 + NH_4Cl \qquad (3)$$

$$RNHCl + 2R'NH_2 \rightarrow RNHNHR' + RNH_2 \cdot HCl \qquad (4)$$

$$RNHCl + 2RR'NH \rightarrow RNHNRR' + RR'NH \cdot HCl \qquad (5)$$

With a di-substituted chloramine, for example:

$$RR'NCl + 2NH_3 \rightarrow RR'NNH_2 + NH_4Cl \qquad (6)$$

$$RR'NCl + 2R'NH_2 \rightarrow RR'NNHR' + R'NH_2 \cdot HCl \qquad (7)$$

$$RR'NCl + 2RR'NH \rightarrow RR'NNRR' + RR'NH \cdot HCl \qquad (8)$$

where R and R' are the same or different alkyl, aryl or alicyclic carbon radicals.

The substituted hydrazine process is carried out in the liquid phase under anhydrous conditions. More specifically, anhydrous substituted chloramine is liquified and mixed with a substantial excess of liquid ammonia or liquid primary or secondary amine, depending upon the substituted hydrazine to be produced. The substituted chloramine of the present invention may be separated from its diluent amine prior to use in the substituted hydrazine process, although separation is not absolutely necessary since the concentration of ammonia or amine with which the substituted chloramine is to be reacted is much greater than the concentration of the diluent amine. We have found that there is substantially no reaction between substituted chloramine and ammonia or amine to form substituted hydrazine in the vapor phase. When, however, these materials are liquified and contacted in the liquid phase, they react readily to form substituted hydrazine. The rate of reaction is dependent to some extent upon temperature. For example, it will be remembered that, in the substituted chloramine synthesis, the product together with its diluent amine were condensed to a liquid at a low temperature. This condensation temperature is sufficiently low that, while the substituted chloramine and amine are in the liquid phase, the rate of reaction between these materials is very low. When the temperature is raised, while maintaining sufficient pressure to retain only a liquid phase, the rate of reaction increases. Finally, when a great excess of liquid amine or liquid ammonia is introduced to the system, as in our novel substituted hydrazine process, the rate of reaction is still further increased.

Thus, in our novel substituted hydrazine process, the minimum temperature and indeed the temperature range at which reaction takes place sufficiently rapidly to be practical is not susceptible of precise definition, since the reactivity of the reactants is determined to a great extent by the number of carbon atoms in their substituents. It is imperative to the success of the process that the reactants be maintained in the liquid phase by proper regulation of pressure, while temperature may vary. By way of example, the reaction between the lower alkyl chloramines and ammonia or lower alkyl amines is conveniently and satisfactorily carried out at room temperature, i. e. about 20° C. However, we have observed that increased yields are attainable at about 50° C.

We have found that, in order to achieve high yields of substituted hydrazine, the concentration of amine or ammonia is necessarily greatly in excess of that required to react with the substituted chloramine present. The concentration of substituted chloramine in the liquid reaction mixture is desirably below 1 mol per liter.

Following reaction, the substituted hydrazine product, as well as the amine hydrochloride or ammonium chloride also formed, is dissolved in the excess liquid amine or ammonia. Separation may be effected by treating with an excess of a strong, anhydrous, non-volatile alkali, such as sodium hydroxide, to remove chloride-containing constituents, followed by fractionation to recover pure substituted hydrazine product.

The present invention is further illustrated in the following examples:

*Example I*

A 9-inch long, 1-inch inside diameter glass tube fitted with suitable stoppers at the intake and exit ends, was provided with an external heating coil and served as the reactor. An amine jet was located ½ inch and a chlorine jet 2½ inches from the intake end of the tube. A single exhaust pipe at the end of the tube was directed to the bottom of a 500 cc. Erlenmeyer flask filled with glass wool, which acted as a filter. The exhaust from the flask was directed to a glass receptacle maintained at −78° C. where the product was condensed, collected and stored. Dimethylamine vapor and chlorine were simultaneously introduced to the reactor through their respective jets in a mol ratio of amine:chlorine of 92:1. The rate of flow of dimethylamine was 0.224 mol/min. The interior of the reactor was maintained at 50°–70° C., and the addition of amine and chlorine continued for 14 minutes. Liquid product and dimethylamine collected at −78° C. amounted to 151 grams. Analysis of the solid residue in the filter and on the walls of the reactor indicated a yield of dimethyl chloramine, based on chlorine, equivalent to 90.5% of theoretical.

*Example II*

A liquid mixture of dimethylamine and dimethyl chloramine (mol ratio amine:chloramine of 39:1), prepared in accordance with the method of Example I, in the amount of 144 grams was injected into a pressure vessel containing 21.4 mols of liquid ammonia at 25° C. and 127 p. s. i. g. The concentration of dimethyl chloramine was 0.1 mol per liter of the mixture. Pressure and temperature were maintained for 86 hours, a period greatly in excess of that required for completion of the reaction to form 1,1-dimethyl hydrazine. In order to determine the yield of 1,1-dimethyl hydrazine, the liquid reaction mixture was first neutralized with hydrochloric acid, and an aliquot portion of the solution was made 7N with respect to HCl. This portion was then rapidly titrated below 5° C. with a standard potassium iodate solution to the iodine monochloride end point. The reactions involved in such a titration, and the method of determining the particular hydrazine present are described by McBride et al. in Analytical Chemistry, vol. 25, No. 7 (July 1953) at p. 1042 et seq. This analysis proved a 73% yield of 1,1-dimethyl hydrazine.

*Example III*

Methyl chloramine was prepared in accordance with the general method and in the apparatus of Example I. Specifically, methylamine vapor and chlorine were continuously introduced to the reaction tube for approximately 36 minutes at atmospheric pressure. The mol ratio of methylamine:chloride was 52:1, and the reaction temperature was 50° C. Analysis, following filtration and condensation of the gaseous effluent at −13° C., proved an 85% yield of methylchloramine.

*Example IV*

Symmetrical dimethyl hydrazine (1,2-dimethyl hydrazine) was prepared by injecting a quantity of the liquified methylamine-methyl chloramine product of Example III (mol ratio methylamine:methyl chloramine of 58:1) into liquid methylamine at 50° C. to a final concentration of 0.35 mol methyl chloramine per liter of the mixture. Analysis of the resulting product confirmed the formation 1,2-dimethyl hydrazine.

The present invention lends itself particularly well to a continuous cyclic process for the preparation of a substituted hydrazine. By way of illustration, assume the preparation of 1,1-dimethyl hydrazine. Dimethylamine vapor and chlorine gas in a mol ratio of 15:1 are contacted at atmospheric pressure in the gas phase at 60° C. Contact time is approximately 1 minute, and the yield of dimethyl chloramine is 90% based on $Cl_2$. Dimethylamine hydrochloride solid is filtered from the gas mixture, after which the mixture is liquified by cooling to about 7° C. The liquid dimethyl chloramine-dimethylamine mixture is then pumped into sufficient liquid ammonia at about 30° C. and 200 p. s. i. g. so that the final concentration of dimethyl chloramine is about 0.1 mol/liter. Reaction time is approximately 5 minutes, and the yield of 1,1-dimethyl hydrazine is 80%. The reaction mixture is separated into three parts of fractionation: (1) ammonia, which is recycled to the hydrazine step; (2) dimethylamine, which is recycled to the chloramine step; and (3) a dimethylamine-dimethyl hydrazine-dimethylamine hydrochloride mixture. The dimethylamine hydrochloride is formed through decomposition of ammonium chloride during fractionation. This latter fraction (3) containing the 1,1-dimethyl hydrazine product is treated with excess anhydrous sodium hydroxide equivalent to about 2.5 mols NaOH per mol of dimethylamine hydrochloride to remove the chloride ions as sodium chloride. The product 1,1-dimethyl hydrazine is separated from dimethylamine by a second fractionation.

We claim:

1. An anhydrous, vapor phase process for preparing substituted chloramine which comprises contacting chlorine gas with an excess over two mols per mol of chlorine of a gaseous lower alkyl amine containing at least one hydrogen atom in the amino group, while preventing the formation of a liquid phase.

2. An anhydrous, vapor phase process for preparing substituted chloramine which comprises contacting chlorine gas and a vapor of an amine of the group consisting of lower alkyl monoamines and lower alkyl diamines in a molar ratio of amine to chlorine greater than about 5:1, under conditions of temperature and pressure sufficient to prevent formation of a liquid phase.

3. A process as set forth in claim 2 wherein the temperature is above about 50° C., and the pressure is atmospheric.

4. An anhydrous process for preparing dimethyl chloramine which comprises contacting dimethylamine vapor and chlorine gas in a molar ratio of dimethylamine to chlorine greater than 5:1, at a temperature above about 50° C. at atmospheric pressure.

5. An anhydrous process for preparing methyl chloramine which comprises contacting methylamine vapor and chlorine gas in a molar ratio of methylamine to chlorine greater than about 5:1, at a temperature above about 50° C. at atmospheric pressure.

6. The process of claim 4 including separating solid dimethylamine hydrochloride from the gaseous reaction mixture, and subsequently condensing and collecting dimethyl chloramine.

7. The process of claim 5 including separating solid methylamine hydrochloride from the gaseous reaction mixture, and subsequently condensing and collecting methyl chloramine.

8. An anhydrous process for preparing a substituted hydrazine which comprises introducing a liquid substituted chloramine selected from the group consisting of lower alkyl mono and di-substituted chloramines into an excess of an anhydrous liquid nitrogen-containing compound selected from the group consisting of ammonia and lower alkyl substituted primary and secondary amines so that the concentration of substituted chloramine in the mixture does not exceed 1 mol per liter under sufficient pressure to maintain the liquid phase, and subsequently separating the substituted hydrazine product from the reaction mixture.

9. An anhydrous process for preparing a lower alkyl hydrazine of the general formula $R_xH_{(4-x)}N_2$ in which R is a lower alkyl radical and $x$ has one of the values 1, 2, 3 and 4, which comprises reacting a liquid substituted chloramine of the general formula $R_yH_{(2-y)}NCl$ in which R is a lower alkyl radical and $y$ has one of the values 1 and 2, with a liquid nitrogen-containing compound selected from the group consisting of ammonia and primary and secondary lower alkyl amines, the concentration of substituted chloramine in the reaction mixture being less than about 1 mol per liter, at a temperature above about 20° C. under sufficient pressure to maintain the liquid phase, and subsequently separating a lower alkyl hydrazine product from the reaction mixture.

10. An anhydrous process for preparing 1,1-disubstituted lower alkyl hydrazine which comprises mixing sufficient liquid ammonia with liquid disubstituted lower alkyl chloramine so that the final mixture contains up to 1 mol of substituted chloramine per liter, maintaining the mixture in the liquid phase, and subsequently separating 1,1-disubstituted lower alkyl hydrazine therefrom.

11. An anhydrous process for preparing methyl hydrazine which comprises reacting liquid methyl chloramine with liquid ammonia, the concentration of methyl chloramine in the reaction mixture being less than about 1 mol per liter, under sufficient pressure to maintain the reactants in liquid phase, and subsequently separating methyl hydrazine from the reaction mixture.

12. An anhydrous process for preparing 1,1-dimethyl hydrazine which comprises reacting liquid dimethyl chloramine with liquid ammonia, the concentration of methyl chloramine in the reaction mixture being less than about 1 mol per liter, under sufficient pressure to maintain the reactants in liquid phase, and subsequently 1,1-dimethyl hydrazine from the reaction mixture.

13. An anhydrous process for preparing 1,2-dimethyl hydrazine which comprises reacting liquid methyl chloramine with liquid methylamine, the concentration of methyl chloramine in the reaction mixture being less than about 1 mol per liter under sufficient pressure to maintain the reactants in liquid phase, and subsequently separating 1,2-dimethyl hydrazine from the reaction mixture.

14. An anhydrous process for preparing substituted hydrazine which comprises contacting the vapor of an amine, selected from the group consisting of lower alkyl, primary and secondary amines with chlorine gas in a molar ratio of amine to chlorine greater than 5:1 at a temperature sufficiently high to prevent formation of a liquid phase, whereby a solid hydrochloride of said amine and a lower alkyl substituted chloramine is formed, separating said solid amine hydrochloride from the gaseous reaction mixture, subsequently condensing and collecting the substituted chloramine thus formed and excess amine, reacting the liquid substituted chloramine with an excess of a liquid nitrogen-containing compound selected from the group consisting of ammonia and lower alkyl primary and secondary amines, the concentration of substituted chloramine in the liquid reaction mixture being less than about 1 mol per liter, under sufficient pressure to maintain the reactants in liquid phase, and subsequently separating substituted hydrazine from the reaction mixture.

15. An anhydrous process for preparing a methyl substituted hydrazine which comprises contacting the vapor of an amine, selected from the group consisting of methylamine and dimethylamine, with chlorine gas in a molar ratio of amine to chlorine greater than 5:1 at a temperature sufficiently high to prevent formation of a liquid phase, separating amine hydrochloride from the gaseous reaction mixture, subsequently condensing and collecting the methyl substituted chloramine thus formed an excess amine, reacting the liquid methyl substituted chloramine with an excess of a liquid nitrogen compound selected from the group consisting of ammonia and methylamine, the concentration of the methyl substituted chloramine in the liquid reaction mixture being less than 1 mol per liter, while maintaining the reactants in liquid phase, and subsequently separating methyl substituted hydrazine from the reaction mixture.

16. A cyclic anhydrous process for preparing 1,1-dimethyl hydrazine which comprises first preparing dimethyl chloramine by contacting dimethylamine vapor with chlorine gas, in a molar ratio of amine to chlorine greater than 5:1, at a temperature above about 50° C., thereby forming dimethyl chloramine and dimethylamine hydrochloride, separating solid dimethylamine hydrochloride from the gaseous mixture, condensing the gaseous mixture consisting essentially of dimethylamine and dimethyl chloramine, and subsequently reacting the liquid dimethyl chloramine mixture with excess liquid ammonia, the concentration of dimethyl chloramine in the liquid ammonia - dimethylamine - dimethyl chloramine mixture being less than 1 mol per liter, while maintaining the reactants in liquid phase, thereby forming 1,1-dimethyl hydrazine, separating the liquid reaction mixture into three fractions, (1) a dimethylamine fraction, (2) an ammonia fraction, and (3) a dimethylamine-dimethylamine hydrochloride-dimethyl hydrazine fraction, treating this latter fraction with an excess of strong, anhydrous non-volatile alkali thereby removing chloride-containing constituents, subsequently fractionating to separate anhydrous 1,1-dimethyl hydrazine, recycling fraction (1) to the dimethyl chloramine step, and recycling fraction (2) to the dimethyl hydrazine step.

References Cited in the file of this patent
UNITED STATES PATENTS

| | | |
|---|---|---|
| 2,459,759 | Alliger | Jan. 18, 1947 |
| 2,581,921 | Alliger | Jan. 8, 1952 |